INVENTOR
L. A. McCARTHY
BY
W.C. Parnell
ATTORNEY

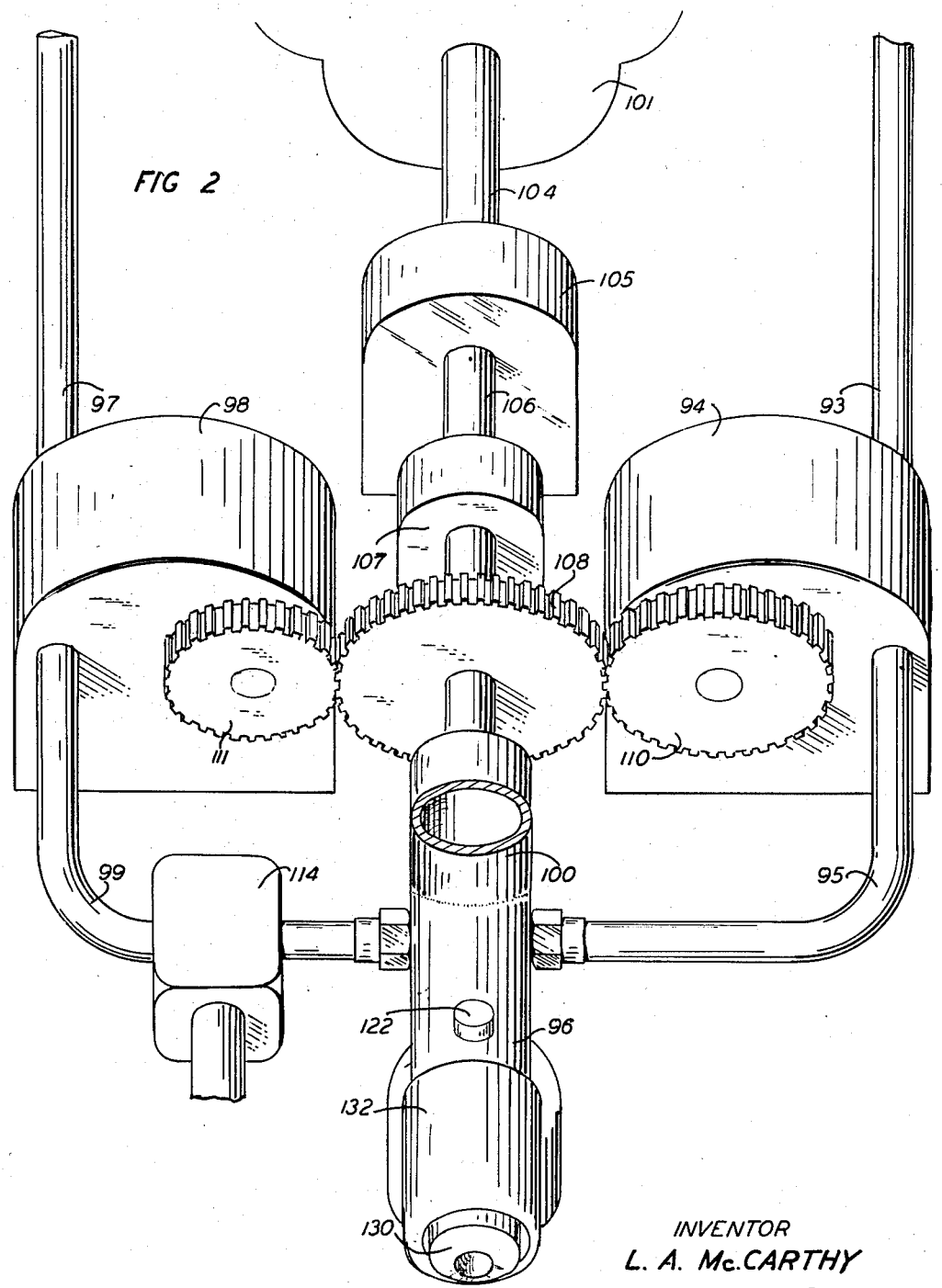

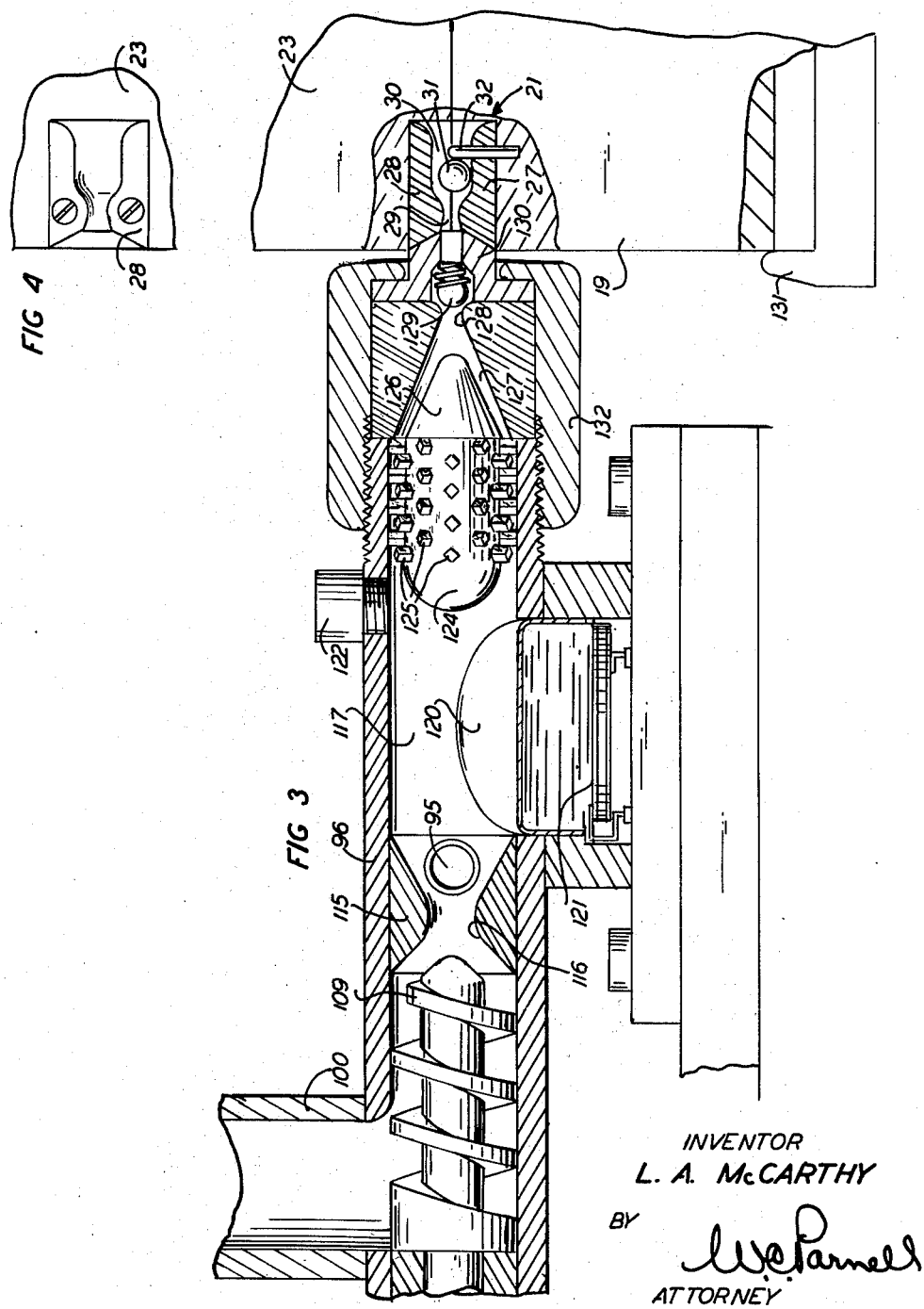

June 30, 1959 L. A. McCARTHY 2,892,214
APPARATUS FOR MOLDING LIQUID RESIN MATERIALS
Filed April 5, 1954 5 Sheets-Sheet 4

INVENTOR
L. A. McCARTHY
BY
*Lee Parnell*
ATTORNEY

June 30, 1959 L. A. McCARTHY 2,892,214
APPARATUS FOR MOLDING LIQUID RESIN MATERIALS
Filed April 5, 1954 5 Sheets-Sheet 5
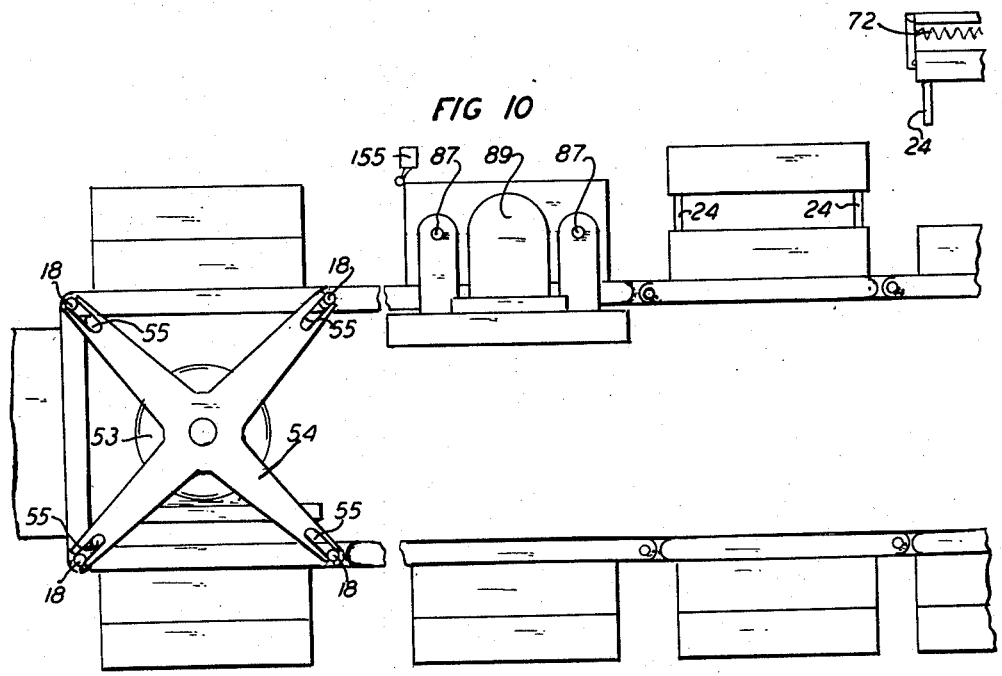
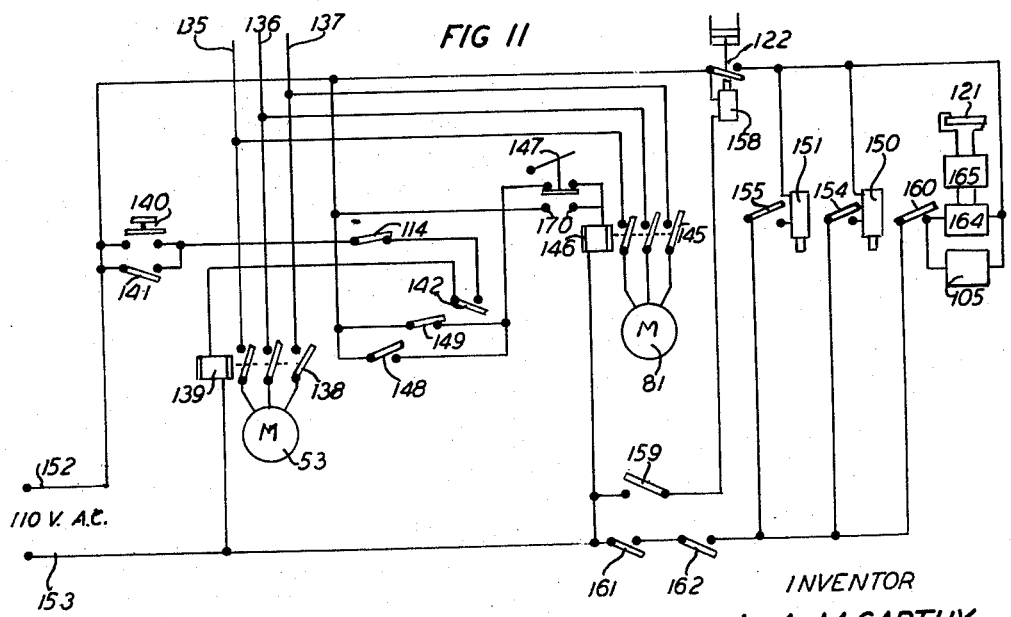
INVENTOR
L. A. McCARTHY
BY
W. E. Parnell
ATTORNEY

United States Patent Office 2,892,214
Patented June 30, 1959

2,892,214

APPARATUS FOR MOLDING LIQUID RESIN MATERIALS

Lawrence A. McCarthy, Haverhill, Mass., assignor to Western Electric Company, Incorporated, New York, N.Y., a corporation of New York Application April 5, 1954, Serial No. 420,938

7 Claims. (Cl. 18—30)

This invention relates to an apparatus for molding materials particularly liquid resins.

In the manufacture of various types of electric units for use in the communication art, means must be provided to encase these units to weatherproof them and to mechanically protect them against damage. In the past, various methods of enclosing such fragile articles have included metal containers and potting compounds capable of surrounding the articles without causing damage thereto. Thought was given to the possibility of embedding the articles in materials as a result of the conventional injection, transfer and compression molding processes, but due to the apparent damage to the fragile articles resulting from the typical high pressures necessary in these processes, it was determined that they would be impractical. However, it was determined that, with the use of thermosetting plastic resins which are in a liquid state at room temperature, fragile articles could be molded under low pressures free of damage thereto. These plastic resins are the type which are caused to cure by the addition of a catalyst or hardener and sometimes the addition also of heat of the order of 100° F. to 300° F.

An object of the invention is an apparatus for molding articles of materials such as liquid resins.

With this and other objects in view the invention comprises an apparatus for molding a material such as a liquid resin including means to mix the materials under pressure and means responsive to the pressure on the mixed materials to force them into the mold.

In the present embodiment of the invention, a mixing chamber mounted at a fixed position has a nozzle into engagement with which molds are successively positioned to receive a liquid resin fed in a measured stream to the mixing chamber where it meets a measured stream of a catalyst or hardener and a measured quantity of a filler advancing continuously under a suitable pressure to cause the mixture to fill the mold. These materials advancing toward the mold in the mixing chamber are thoroughly mixed by, for example, ultrasonic vibrations and continue to travel into the mold until the mold is filled. As a result of an increased pressure on the material in the mixing chamber when the mold is filled, the power means for feeding the materials is deenergized. A mold opening and closing unit is electrically controlled and performs the majority of its functions during the interval of rest of a conveyor for the molds so that while one mold is being filled, another mold is emptied of its molded articles and conditioned for another molding operation by disposing inserts in the mold cavities.

Other objects and advantages will be apparent from the following detailed description when considered in conjunction with the accompanying drawings, wherein:

Fig. 2 is an enlarged fragmentary isometric view of the material feeding means and the mixing chamber;

Fig. 3 is a vertical sectional view of the mixing chamber showing a mold in interengagement with its nozzle;

Fig. 4 is a fragmentary top plan view of a portion of the bottom mold;

Fig. 10 is a fragmentary side elevational view of the conveyor for the molds, and Fig. 11 is a wiring diagram of the electrical control for the apparatus.

Figure 1:
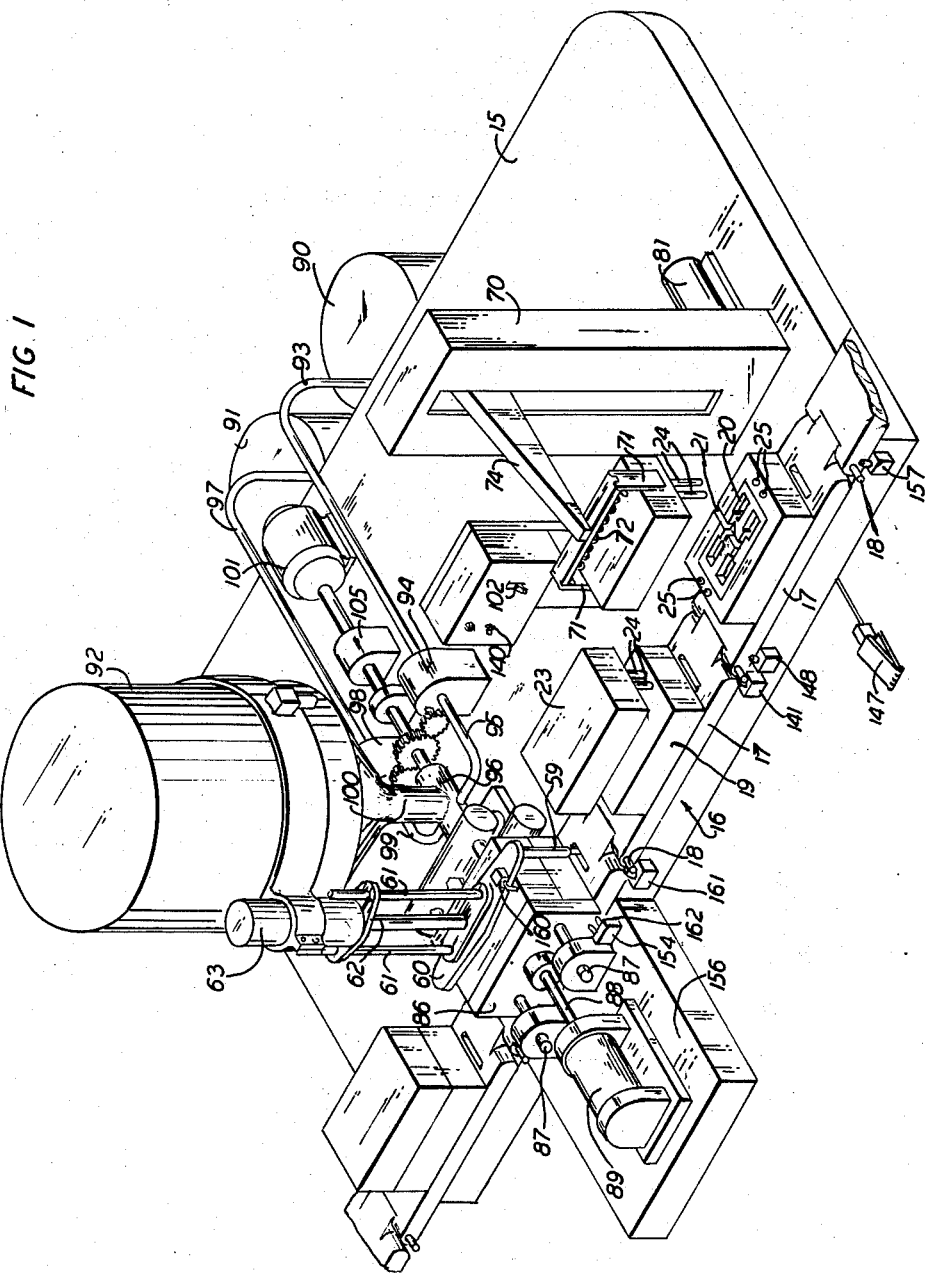
Fig. 1 is an isometric view of the apparatus.

Referring now to the drawings, attention is first directed to Fig. 1 which illustrates a table 15 supporting a conveyor 16 composed of link-like supports 17 identical in structure and hingedly connected by the aid of spindles 18. Lower mold members 19 are fixedly mounted on the support 17 and are provided with cavities 20 joined by conventional passageways leading to the cavities from a gate portion 21. Upper mold members 23, similar in contour to the lower mold members, may be provided with like cavities, passageways and a gate portion (not shown) similar in contour to those of the lower mold member 19. Pairs of pins 24 fixedly mounted at the ends of the upper mold are receivable in apertures 25 of the lower mold so as to assure alignment of the upper mold members with their respective lower mold members and, through the aid of the locking means shown in Figs. 5 to 8 inclusive, positively hold the mold members in closed positions.

The specific structures of the gate members are shown in Figs. 3 and 4. The lower gate member 27 for the lower mold member 19 is identical with the upper gate member 28 for the upper mold member 23 providing a passageway which is relatively small at its entrance end 29 and larger near its exit end 30 so that a metal ball 31 disposed in the lower gate member 27 and held against displacement by a pin 32 may permit material to enter the mold through the gate as long as the material is forced therein under pressure but will act as a valve lying against the smaller portion 29 of the passageway to seal material in the mold under pressure.

The locking means for the molds, shown in Figs. 5 to 8 inclusive, includes, in the present embodiment of the invention, clamping plates 35 having spaced vertically extending grooves for the pins 24 and disposed in recesses of their respective supports 17. Locking elements 36 having threaded shaft-like members 37 disposed in threaded apertures of the support 17 are provided with arms 38 disposed in laterally extending apertures 39 in the support. These locking elements are identical in structure with one exception, that being the threads on their shafts 37. One is provided with right-hand threads while the other is provided with left-hand threads.

Figure 5:
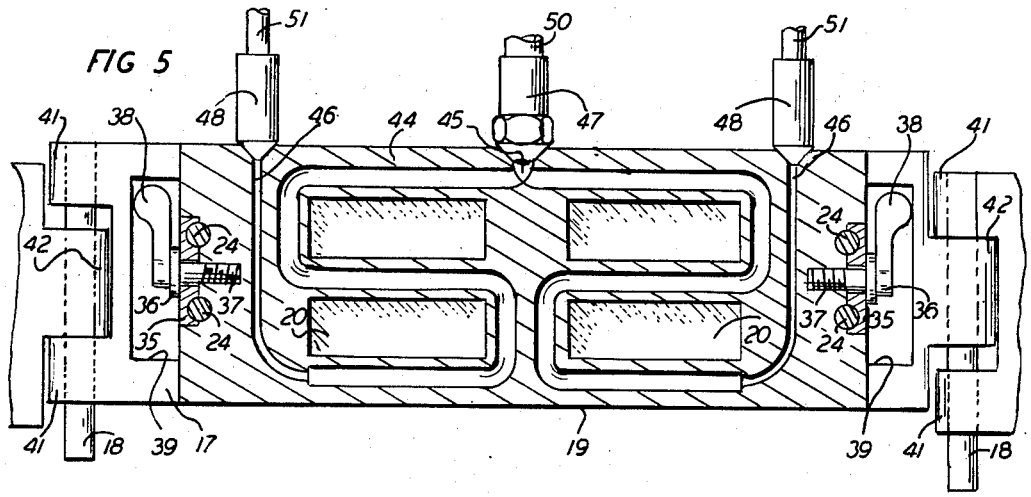
Fig. 5 is a horizontal sectional view of one of the molds illustrating steam passageways associated with steam valves.

While viewing Fig. 5, attention is directed to the hinged structure of the supports 17 including the double shaft supporting portions 41 at the leading ends spaced distances apart greater than the widths of the single apertured portions 42 at the trailing ends of the supports so that at the loading station, each support with its mold may be moved laterally to move the gate 21 of its mold into engagement with the nozzle of the mixing chamber and to also move passageways 44 with an inlet 45 and outlets 46 into engagement with valves 47 and 48 respectively. It will be noted that the passageways 44 surrounded the cavities 20 of the lower mold member in Fig. 5 so that steam from a supply line 50 may enter the passageways through valve 47 and be directed adjacent and around the cavities to heat the mold, the steam escaping from the outlets 46 through valves 48 and lines 51. The valves 47 and 48 are of the commercially known, normally closed spring actuated type so that when each mold with its support at the loading position is moved to the position shown in Fig. 5, the valves 47 and 48 will be actuated against their springs into open positions, these valves with their spring forces being utilized to return the support with the mold into alignment with the other supports in the conveyor.

In Fig. 5, a horizontal sectional view of the lower mold member 19 of one of the supports 17 is shown with the steam passageways 44 and the set of valves 47 and 48. The upper mold member 23 is similar in general contour to the lower mold member and has a like set of steam passageways and outlets, therefor, to be connected with a like set of valves 47 and 48.

A driving means for the conveyor, shown schematically in Fig. 10, includes a motor 53 for driving a sprocket type element 54. In the present embodiment of the invention, the element 54 includes radially extending equally spaced arms with notches or apertures 55 in the ends thereof adapted for interengagement with the outwardly projecting ends of the spindles or shafts 18. The conveyor may be of any desired over all length depending upon the time required for the molded resin to cure and, although the table 15 (shown in Fig. 1) is the only support illustrated for the conveyor, it is to be understood that any additional supports required, for the upper portion of the conveyor and for the lower portion thereof (shown in Fig. 10) may be provided.

Figure 6:
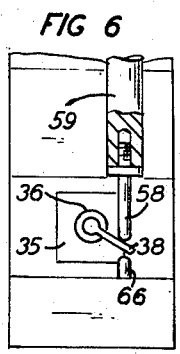
Fig. 6 is a fragmentary detailed view of the mold locking means.
Figure 7:
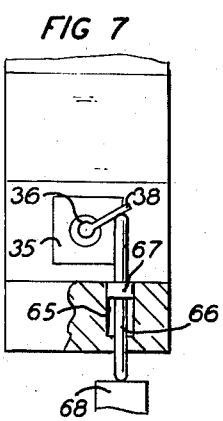
Fig. 7 is a fragmentary detailed view of the mold unlocking means.

The locking means namely the elements 36, may be actuated in one direction (as illustrated in Fig. 6) by adjustable plungers 58 carried by arms 59 mounted at the ends of a vertical clamp 60 (Fig. 1) which is adapted to force the mold members into closed positions at the loading station. The vertical clamp 60 is held in a given position relative to the conveyor by guide rods 61 and is connected to a piston rod 62 of an air cylinder 63. When the clamp 60 is moved into its clamping position (shown in Fig. 1) the plungers 58 will engage the upper surfaces of the arms 38 to rock them clockwise, rotating the threaded portions 37 to bring about locking of the clamping plates 35 against the pins 24.

Each support 17 has apertures 65 beneath the ends of the arms 38 to receive pins 66 which normally rest on their collars 67 but are adapted to be moved upwardly by a cam 68 (Figs. 7 and 8) as the supports of the conveyor approach the opening station shown at the right (Fig. 1). The cam 68 moves the pins 66 upwardly to engage their respective arms 38 and rock them counterclockwise sufficiently to loosen the holding force of the plates 35 to free the rods 24 and thus free the upper mold member in each instance for removal from the lower mold member.

Figure 9:
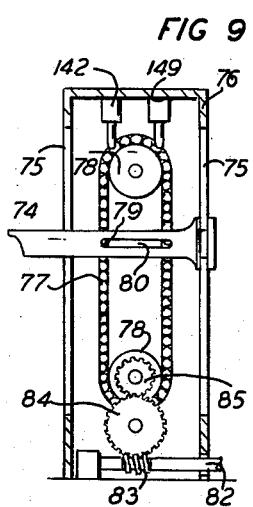
Fig. 9 is a vertical sectional view of the mold opening and closing unit.
Figure 8:
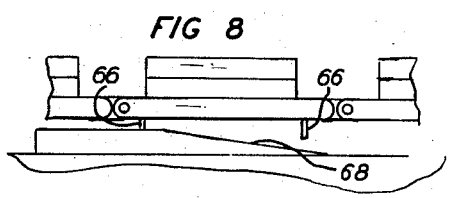
Fig. 8 is a fragmentary side elevational view illustrating the cam action for the mold unlocking means shown in Fig. 7.

An opening and closing unit 70 mounted on the table 15 includes gripping jaws 71 normally urged toward each other about their pivots by a spring 72 and supported by an arm 74 which is operatively connected to a drive means to move the arm vertically between given limits through two complete cycles from its top limit to its bottom limit to engage the top mold member, lift it to its top limit and hold it there during emptying of the mold and the insertion of parts or articles in the mold cavities, after which the arm is moved through another complete cycle to lower the top mold in place, release it and return it to its top starting position. One means for accomplishing this action of the arm 74 is shown in Fig. 9 and includes suitable guides in vertical apertures 75 in the housing 76 of the unit to maintain the general horizontal position of the arm, yet permit it to move vertically between its given limits. To illustrate this action, an endless chain 77 mounted on sprockets 78, carries a pin 79 positioned to ride in an elongate aperture 80 of the arm so that during a complete cycle of the pin 79 on the chain starting, for example, at the extreme top, the arm 74 will move from its top starting position to its lowermost position and back. The sprockets 78 are driven by a motor 81 (Fig. 1) through a shaft 82 (Fig. 9) a worm 83, a worm gear 84, and other gears including a gear 85 mounted on the shafts of the lowermost sprocket 78 with the worm gear 84.

Attention is now directed to Figs. 1, 2 and 3 which illustrate the fluid feeding mechanism and also the horizontal clamp shown only in Fig. 1, the horizontal clamp includes a plate or clamping element 86 positioned normally away from the supports 17 of the conveyor, supported by guide rods 87 and actuated by a piston rod 88 of an air or hydraulic cylinder 89.

The three main materials used in the molding apparatus include a liquid resin disposed in a supply tank 90, a catalyst or hardener disposed in a supply tank 91 and a powdered type filler disposed in a reservoir or receptacle 92. A fluid line 93 extends from the tank 90 to a measuring pump 94 while a fluid line 95 extends from the measuring pump 94 to a mixing chamber 96. A fluid line 97 extends from the supply tank 91 to a measuring pump 98 while a fluid line 99 extends from the measuring pump 98 to the mixing chamber 96. The receptacle 92 for the filler is mounted above the mixing chamber 96 and has a supply line 100 extending vertically downwardly into the mixing chamber. A power means including a motor 101 is provided for all three of the materials, the motor being included in an electric circuit (not shown) under the control of a switch 102. The driving means is shown more clearly in Fig. 2 where the shaft 104 for the motor 101 extends to a magnetic clutch 105 while an aligned shaft 106 extends from the magnetic clutch through a bearing 107, a gear 108 fixedly mounted thereon to a point where its forward end is fixed to a feed screw 109 in any suitable manner (not shown). The gear 108 may be of any desired size with respect to gears 110 and 111 for the measuring pumps 94 and 98 respectively, the gears 110 and 111 also being variable in size depending upon the quantities of materials to be forced under predetermined pressures from the measuring pumps into the mixing chamber. In Fig. 2, it will be noted that the lines 95 and 99 enter the mixing chamber 96 at aligned diametrically opposed positions. Line 99 has a pressure controlled normally closed switch 114 mounted therein to cause stopping of the apparatus providing any obstruction should appear in the line. This would cause an increase in pressure in the material, beyond that desired, resulting in operation of the switch 114 into open position, thus stopping the process. This action is desirable so that resin will not get into the mold cavities with insufficient catalyst in its mixture, if necessary, the same type switch can be added to resin line 95.

The mixing chamber 96 is shown more in detail in Fig. 3 including the supply tube or line 100 for the filler communicating directly with the feed screw 109 to feed the filler laterally toward the entrance ends of lines 95 and 99. These entrance lines extend into an element 115 fixed in the mixing chamber and having an aperture 116 of the contour shown so that the filler forced by the feed screw 109 will enter the main or mixing area 117 of the mixing chamber simultaneously with the liquid resin and the liquid catalyst. Aperture 116 also packs the filler somewhat which acts as a dam against the resin mix backing up into the screw feeder.

In the mixing area 117 of the mixing chamber, a resilient diaphragm-like portion 120 of a piezoelectric vibrator or ultrasonic transducer 121 is mounted to bring about a thorough mixing of the materials, namely, the resin, catalyst and filler. Furthermore, in or adjacent the area 117 is mounted a normally closed pressure switch 122 adapted for actuation into open position when the pressure of the material in the mixing chamber becomes greater than a predetermined amount desired for the movement of the material into the molds. A dispersing element 124 mounted near the exit end of the mixing chamber has projections 125 to assist in mixing and maintaining the mixture of the materials. The conical end 126 of the element 124 partially conforms to the conical outlet 127, the extreme outlet 128 being normally closed by a spring-pressed ball-type valve 129 mounted in a nozzle 130. The nozzle 130 has an outer contour conforming somewhat to the recess of the gate members 27 and 28 to assure, under pressure, positive interengagement of each mold gate with the nozzle when the molds are singly moved against a stop 131 (Fig. 3). The nozzle 130 is firmly held in place by a threaded element 132.

Attention is now directed to the schematic circuit shown in Fig. 11 and switches of this circuit shown in Figs. 1 and 10. The conveyor motor 53 may be included in a circuit with lines 135, 136 and 137 through the actuation of contacts 138 of a relay 139. Energization of the relay 139, however, depends on a starting switch 140 and micro-switches 141, 114 and 142. Micro-switch 114 has been described as the pressure operated switch shown in line 99 of Fig. 2. Switch 141 is normally open and remains open while the conveyor is at rest but the moment the conveyor moves, switch 141 is closed by the adjacent support 17 and held closed until the end of this support 17 frees the switch for movement into open position, at which time the next support with its mold has been brought into the molding position. Switch 142 is mounted in the unit 70 to be actuated and held in closed position when the arm 74 is at rest at the top of its movement.

The motor 81 for the unit 70 may be included in a circuit to lines 135, 136 and 137 through the actuation of contacts 145 of a relay 146, which is under the control of a foot switch 147 and micro-switches 148 and 149. Micro-switch 148 is mounted on the table 15 adjacent the conveyor (Fig. 1) to be actuated just before the completion of each movement of the conveyor. In the present illustration, the actuating element of the switch is positioned to be moved by the projecting ends of the spindles 18 to momentarily close the switch. Switch 149, mounted in the housing of unit 70 (Fig. 9) is of the normally closed type, movable into open position by the arm 74.

The air cylinders 63 and 89 are represented in the wiring diagram by their solenoid control valves 150 and 151 respectively, included in circuits by lines 152 and 153 under the immediate control of switches 154 and 155. The switch 155, illustrated in Fig. 10, is actuated into closed position when each mold is moved into the loading position. Switch 154 is adapted to be actuated subsequent to the actuation of the switch 155 so that its valve 150 for controlling the vertical clamp 60 is actuated subsequent to actuation of the horizontal clamp 86. Therefore, switch 154 mounted on the support 156 for the air cylinder 89 is held normally opened by the clamp 86 but is released into its closed position after the horizontal clamp 86 has moved into its clamping position.

Switch 122, disposed in line 152 in advance of switches 154 and 155, may be reset into closed position by an electromagnetic type unit 158 included in a circuit between lines 152 and 153 under the control of a micro-switch 159 mounted on the support 15 (Fig. 1) to be actuated momentarily by each spindle 18 just prior to the completion of each indexing or intermittent movement of the conveyor. The momentary closing of switch 159 operates the unit 158 to reset switch 122, closing it for the next additional operation. A micro-switch 160, mounted on the vertical clamp 60 and adapted to be actuated into closed position at the completion of the clamping operation, closes a circuit when switches 161 and 162 are closed through the magnetic clutch 105 and an oscillator 164. The oscillator 164 is connected to an amplifier 165 which in turn drives the ultrasonic vibrator 121 of the mixing unit 120. Switch 161 is similar to switch 141 in its mounting on the table 15 except that switch 161 is of the normally closed type and is operated into open position during movement of the conveyor while switch 162 is mounted on the support 156 for the air cylinder 89 and is allowed to close only when the horizontal clamp 86 is operated into its clamping position.

Considering now the operation of the apparatus, it will be apparent that with each pressing of the starting switch 140, the conveyor may move the distance of one support 17 to intermittently advance the molds into the loading position. There is a definite interlocking of circuits and controls, however, so that the feeding means for the materials may be actuated only after the horizontal clamp 86 is actuated to bring into interconnection the gate of the mold in the loading position with the nozzle 130 of the mixing chamber 96, and after the vertical clamp 60 has been actuated into closed or clamping position to firmly close the members of the mold and to actuate their locking means or elements 36 (as illustrated in Fig. 6). At this time, the magnetic chuck 105 is energized to connect the shaft of the motor 101 to the three driving means for the materials, namely, the measuring pump 94 for the liquid resin, the measuring pump 98 for the liquid catalyst and the feeding screw 109 for the powdered filler. In this manner, during a continuous movement, for example, of the liquid resin through the mixing chamber and into the mold, a measured quantity or continued measured flow of a liquid catalyst is added to the stream of resin and mixed therewith through the action of the ultrasonic vibrator 120—121 so that there is a thorough mixing of the materials, namely, the resin and its catalyst prior to entering the mold. In following this same illustration, a measured flow of a suitable filler, given its flowing motion through the action of the feed screw, results in the addition of the filler to the resin with the catalyst prior to reaching the mold and in an area where the materials are thoroughly mixed during their advancing or flowing motion to the mold. The moving forces of the materials create the necessary low pressure sufficient for the movement of the mixture into the mold about its spring-pressed ball-type valve 129. This pressure is not sufficient to cause disturbance or damage to the inserts placed in the cavities of the mold but is merely sufficient to assure filling of the cavities with the liquid resin and its other materials.

When the mold in the loading position is filled, pressure of the material will build up beyond the normal pressure causing actuation of switch 122 into open position, immediately opening line 152 (Fig. 11) in advance of switches 154, 155 and 160 allowing these switches to open, immediately stopping the feeding of the materials due to the deenergization of the clutch 105 and opening the clamping units 60 and 86 to allow the forces of the spring actuable valves 47 and 48, after having served their purpose of admitting steam under pressure through the passageways 45 of both mold members thus heating the molds, to return the mold members to their positions with the supports 17 in alignment with the other supports 17 of the conveyor. At this time, the conveyor circuit may be actuated by pressing the starting switch 140 to bring about another intermittent advancement of the conveyor to move another mold to the loading position. By the addition of a commercial type timer, this manual operation could be done automatically if so desired. Prior to leaving the filled mold, attention is directed to the fact that the moment this mold moves away from the nozzle 130, the pressure of the material in the mold attempting to escape through the gate will result in forcing the ball member 31 in position to close the aperture 29, thus sealing the material in the mold under pressure. Each filled mold will continue on in its intermittent movement with the conveyor allowing suitable time for the material or liquid resin to solidify and cure prior to reaching the unit 70. Prior to each mold reaching the unit 70, cam 68 (shown in Fig. 8) will actuate the pins 66 (Fig. 7) upwardly to actuate the locking elements 36 to release the rods 24. A similar cam arrangement can also be used to push ejector pins against the bottoms of the molded parts if such an operation is necessary due to sticking of the finished parts in the mold cavities. After each mold reaches the unit 70, clamps 71 of the arm 74 are moved downwardly to engage the top mold member and raise it to its upward position, thus opening the mold so that the molded articles may be removed from the cavities and the mold members conditioned for another molding operation by inserting in the lower cavities any elements desired to be embedded in the molding material. The temporary closing of switch 148 by the conveyor causes operation of motor 81 through its first cycle to move the arm 74 down to grip the top mold member and up to open the mold, but the motor must be operated through another cycle to lower the top mold member into position and return empty to its top position. As switch 149 is held open by the arm in its top position, it is necessary to by-pass this switch again, but as this cannot be accomplished by switch 148, additional means must be provided. As one illustration of such means, lower contacts 170 for the foot switch 147 are in a circuit with relay 146 when closed to energize motor 81. As previously described, the interlocking of the units prevents advancement of the conveyor while the unit 70 is being operated or the material feeding units are being actuated to feed measured quantities of their materials to the mixing chamber.

This apparatus uses incasement of various types of electric units as an example of only one of its uses. Other uses would be for making structural members from small sizes up to large units such as automotive bodies in which case the various elements of the apparatus would be increased in size proportional to the job which they had to perform. On structural members where high strength is required the incased units would be mats of high strength materials such as fibres of glass, linen, or one of the synthetic fibres. Automobile bodies may be made by this means which would be much cheaper than the present process and which would lend itself more to the manufacturing processes used in the automatic industry today. Other structures which could use the principles covered by this machine would be: boat bodies, handling trays, machine covers, radar radomes, airplane structural members and body covering—in fact any unit or structure which requires high strength light members of irregular shapes.

If fibre mats are used for additional strength the machine might be used without any powder type filler being desired in the resin mix in which case a plug would replace item 115. Other structural members, which now use hand mixed polyesters, could be produced by modifying the molds, in which case, of course, no fibre mats would be used as they are not now. In other words, there would not be any inserts in this case—just filled resin.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for molding a material comprising a mixing chamber having an outlet nozzle mounted at a fixed position, a plurality of molds having upper and lower members with recesses jointly forming cavities and gates, an intermittently movable endless conveyor having supports for the lower mold members, loose hinge connections for the supports whereby the supports and their molds may be moved laterally relative to each other, means to force the material through the mixing chamber and nozzle when a mold is disposed in engagement with the nozzle to fill the mold therewith, and means to move the supports laterally singly to cause interengagement of the gate of each mold with the nozzle.

2. An apparatus for molding a material comprising a mixing chamber having an outlet nozzle mounted at a fixed position, a plurality of molds having upper and lower members with recesses jointly forming cavities and gates, an intermittently movable endless conveyor formed of supports for the lower mold members and, loose hinge connections for the supports whereby the supports and their molds may be moved laterally relative to each other, means to force the material through the mixing chamber and nozzle when a mold is disposed in engagement with the nozzle to fill the mold therewith, means to move the supports laterally singly to cause interengagement of the gates of their molds with the nozzle, and means actuable in advance of the nozzle to move the upper mold members relative to the lower mold members to open and close the molds.

3. An apparatus for molding a material comprising a mixing chamber having an outlet nozzle mounted at a fixed position, a plurality of molds having upper and lower members with recesses jointly forming cavities and gates, an intermittently movable endless conveyor having supports for the lower mold members, loose hinge connections for the supports whereby the supports and their molds may be moved laterally relative to each other, means to force the material through the mixing chamber and nozzle when a mold is disposed in engagement with the nozzle to fill the mold therewith, means to move the supports laterally singly to cause interengagement of the gate of each mold with the nozzle, said mold members having steam passageways therein, a spring actuated normally closed steam valve mounted to be connected with the steam passageways singly and opened when the molds are moved singly into engagement therewith and with the nozzle to thereby heat the mold members.

4. An apparatus for molding a material comprising a mixing chamber having an outlet nozzle mounted at a fixed position, a plurality of molds having upper and lower members with recesses jointly forming cavities and gates, an intermittently movable endless conveyor having supports for the lower mold members, loose hinge connections for the supports whereby the supports and their molds may be moved laterally relative to each other, means to force the material through the mixing chamber and nozzle when a mold is disposed in engagement with the nozzle to fill the mold therewith, means to move the supports laterally singly to cause interengagement of the gate of each mold with the nozzle, said mold members having steam passageways therein, a spring actuated normally closed steam valve mounted to be connected with the steam passageways singly and opened when the molds are moved singly into engagement therewith and with the nozzle to thereby heat the mold members, said spring actuated valve being adapted to return the supports laterally into alignment with the adjacent supports.

5. An apparatus for molding a mixture of materials comprising a mixing chamber having an outlet nozzle disposed at a fixed position, means to mix materials in the chamber to produce thereof a liquid mixture, power means energizable to force the materials under pressure into the chamber and the liquid mixture from the chamber through the nozzle, molds, having gates and adapted to be opened and closed, supported for movement intermittently in a path at right angles to the nozzle, means to move the molds in the path to locate them successively adjacent a filling position with the gates in alignment with the nozzle, and a unit caused to operate by movement of each mold adjacent the filling position to move the mold laterally of the path into the filling position with the gate thereof in interengagement with the nozzle, the molds having passageways therein for a heating fluid and like positioned communicating ports for the passageways, and normally closed valves of heating fluid lines compressible into open positions mounted adjacent the nozzle for engagement with their respective ports and compressed into open positions when each mold is moved laterally into the filling position to open the heating fluid lines to the passageways.

6. An apparatus for molding a mixture of materials comprising a mixing chamber having an outlet nozzle disposed at a fixed position, means to mix materials in the chamber to produce thereof a liquid mixture, power means energizable to force the materials under pressure into the chamber and the liquid mixture from the chamber through the nozzle, molds, having gates and adapted to be opened and closed, supported for movement intermittently in a path at right angles to the nozzle, means to move the molds in the path to locate them successively adjacent a filling position with the gates in alignment with the nozzle, and a unit caused to operate by movement of each mold adjacent the filling position to move the mold laterally of the path into the filling position with the gate thereof in interengagement with the nozzle, the molds having passageways therein for a heating fluid and like positioned communicating ports for the passageways, and normally closed valves of heating fluid lines compressible into open positions mounted adjacent the nozzle for engagement with their respective ports when each mold is moved laterally into the filling position, means to cause the unit to free each mold when each mold is filled, the valves being compressed open by movement of each mold laterally into the filling position and adapted to cause reverse movement of each mold from the filling position toward the path when each mold is filled and freed of the unit.

7. An apparatus for molding liquid resin comprising a stationary mixing chamber having a fixed position outlet nozzle, a plurality of molds having cavities and gates to the cavities adapted for engagement singly with the nozzle, means to support the molds for movement into alignment with the nozzle, a unit operable to force the molds singly toward the nozzle to hold the gates of the molds in liquid tight connection with the nozzle, means to force the liquid resin through the mixing chamber and nozzle when a mold is held in engagement with the nozzle to fill the mold with the liquid resin, means actuable to render the forcing means ineffective when each mold is filled with the liquid resin under a given pressure, said molds having inlet and outlet ports and passageways around the cavities from the inlets to the outlets, and connectors for a supply of a heating fluid, mounted for engagement with the inlet and outlet of each mold when forced by the unit to engage the gate and the nozzle, to cause the heating fluid to flow through the passageway of each mold to heat the mold.

References Cited in the file of this patent

UNITED STATES PATENTS

| | | |
|---|---|---|
| 2,027,165 | Grubman | Jan. 7, 1936 |
| 2,138,051 | Williams | Nov. 29, 1938 |
| 2,227,263 | Knowles | Dec. 31, 1940 |
| 2,306,107 | Henderson | Dec. 22, 1942 |
| 2,327,227 | Tucker | Aug. 17, 1943 |
| 2,374,069 | Balthis | Apr. 17, 1945 |
| 2,376,085 | Radford et al. | May 15, 1945 |
| 2,402,805 | Cousino | June 25, 1946 |
| 2,430,033 | Stacy et al. | Nov. 4, 1947 |
| 2,442,368 | Maynard | June 1, 1948 |
| 2,456,778 | Gilchrist | Dec. 21, 1948 |
| 2,470,402 | Jobst | May 17, 1949 |
| 2,478,013 | Roddy | Aug. 2, 1949 |
| 2,494,588 | Skooglund | Jan. 17, 1950 |
| 2,540,146 | Stober | Feb. 6, 1951 |
| 2,693,007 | Rhodes | Nov. 2, 1954 |
| 2,698,964 | Tornberg | Jan. 11, 1955 |
| 2,734,226 | Willert | Feb. 14, 1956 |

FOREIGN PATENTS

| | | |
|---|---|---|
| 581,642 | Great Britain | Oct. 21, 1946 |
| 606,331 | Great Britain | Aug. 11, 1948 |